May 2, 1967  R. J. PETERSON  3,316,860
ICE CREAM SANDWICH MACHINE
Filed April 28, 1966  4 Sheets-Sheet 1

INVENTOR.
ROBERT J. PETERSON
BY Joseph P. O'Halloran
AGENT

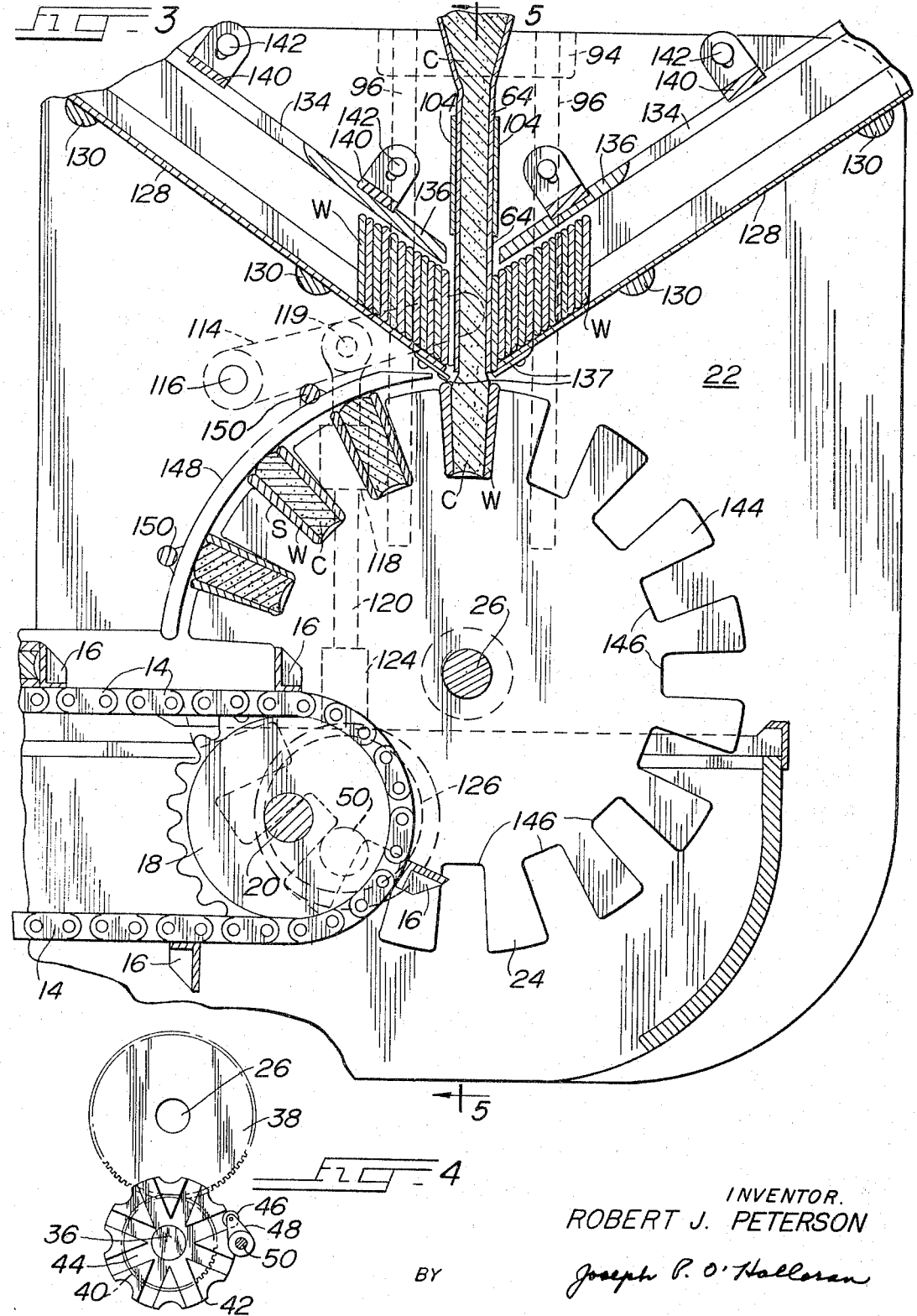

May 2, 1967
R. J. PETERSON
ICE CREAM SANDWICH MACHINE
3,316,860
Filed April 28, 1966
4 Sheets-Sheet 3
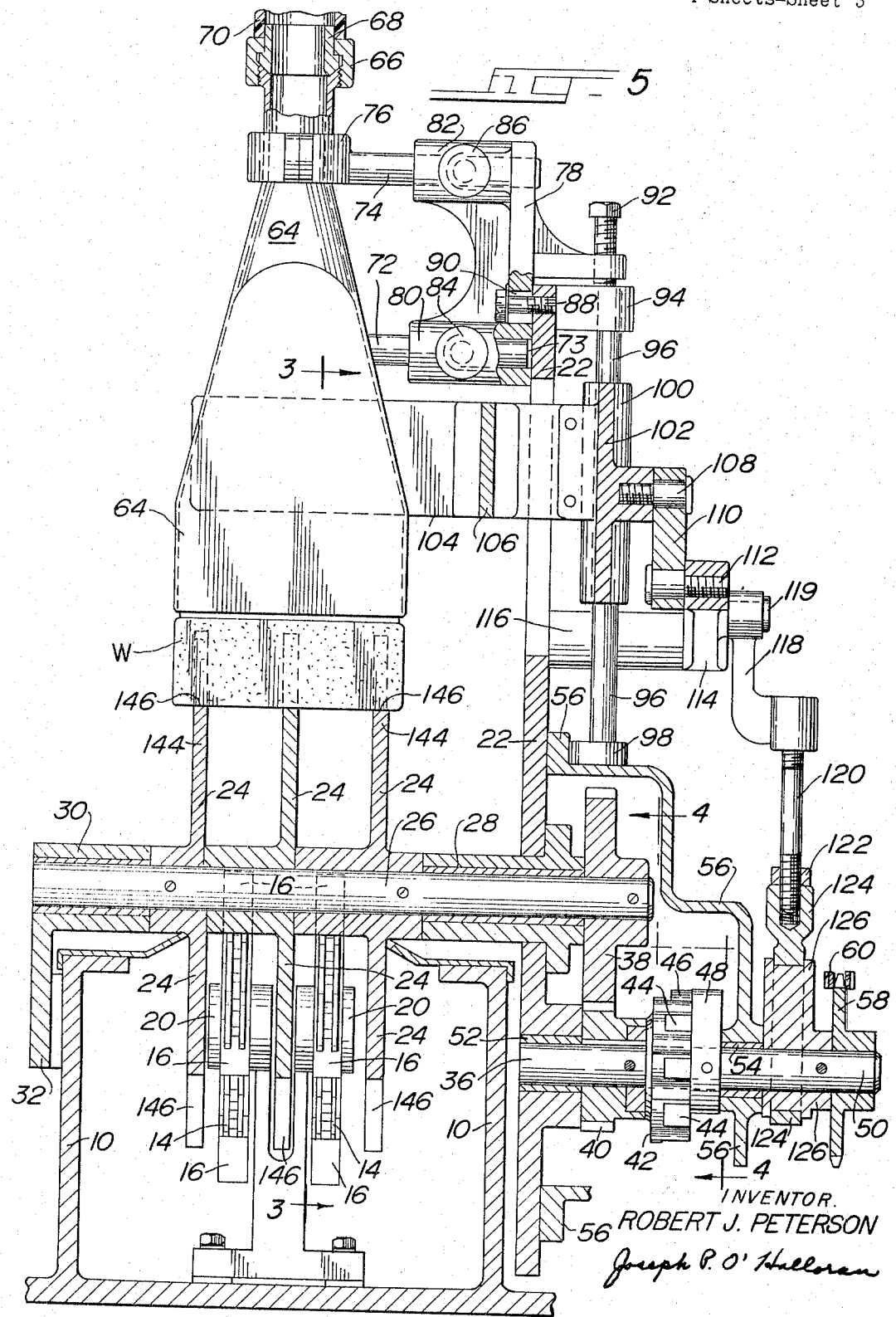
INVENTOR.
ROBERT J. PETERSON
Joseph P. O'Halloran
AGENT May 2, 1967 R. J. PETERSON 3,316,860
ICE CREAM SANDWICH MACHINE
Filed April 28, 1966 4 Sheets-Sheet 4
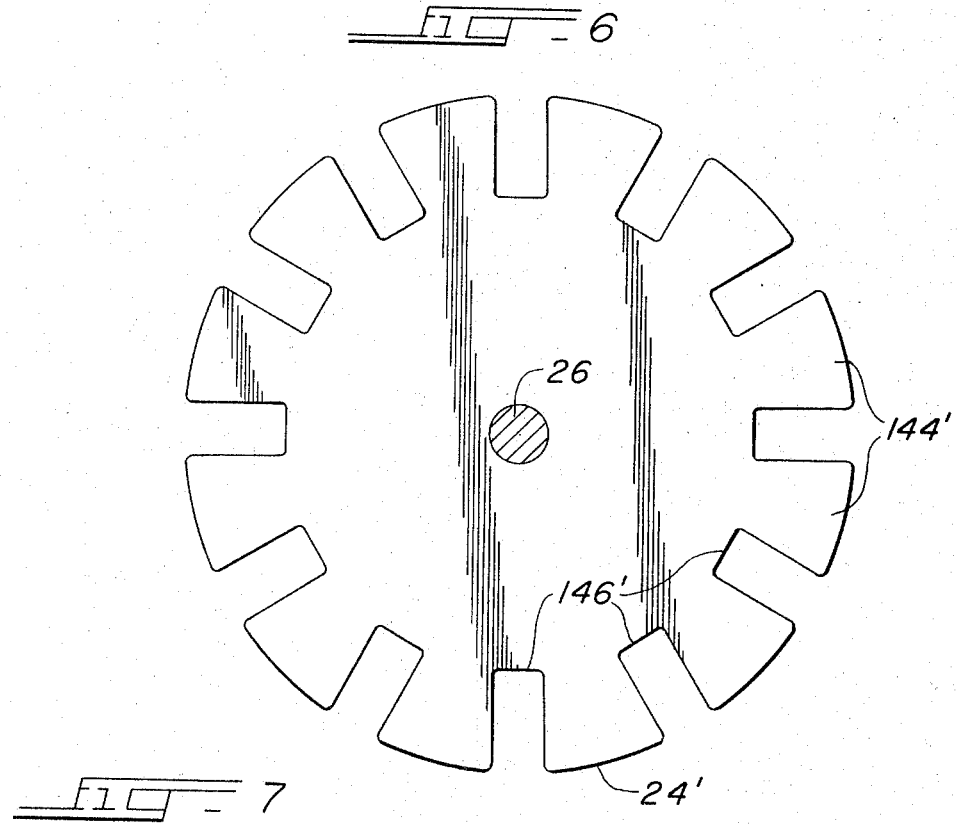
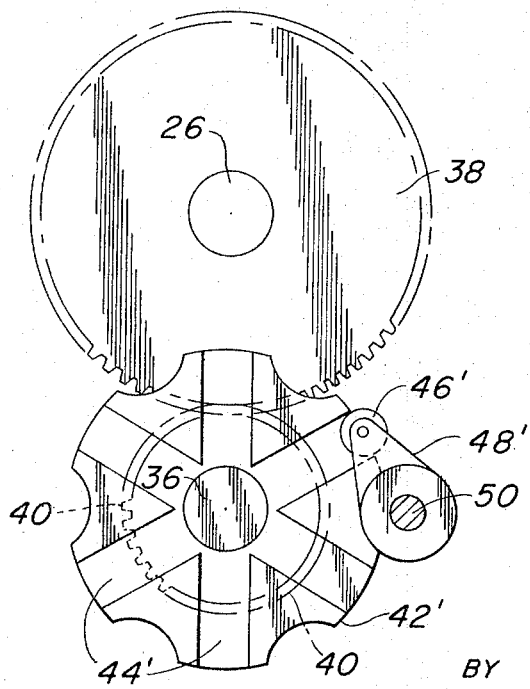
INVENTOR
ROBERT J. PETERSON
BY Joseph P. O'Halloran
AGENT

United States Patent Office 3,316,860
Patented May 2, 1967

3,316,860
ICE CREAM SANDWICH MACHINE
Robert J. Peterson, Linden, N.J., assignor to The Quaker Oats Company, Chicago, Ill., a corporation of New Jersey
Filed Apr. 28, 1966, Ser. No. 546,033
3 Claims. (Cl. 107—1)

This invention relates to an improvement in an ice cream sandwich machine. It particularly relates to an improvement in machines which make ice cream sandwiches from ice cream, being continuously extruded from a nozzle, and from stacks of wafers, from which two wafers at a time are extracted and placed on opposite sides of the ice cream, and which utilize a separating means consisting of a circular rotary conveyer having notches or pockets equally spaced along its circumference. Such a machine is described in U.S. Patent 2,794,404 to E. J. Rapp.

The wafers employed in the manufacture of ice cream sandwiches must be reasonably firm, flavorsome and wholesome. However, they must also be tender. The degree of toughness of the wafers can not be dictated solely by the requirements of the machine producing the sandwich but is dictated mainly by the consumer. Consumers reject ice cream sandwiches having wafers which are intolerably tough and resistant to chewing and breaking. Moreover, consumers are dissatisfied with ice cream sandwiches utilizing wafers which are not tender enough to be broken and chewed easily. Hence, the nature of the ice cream sandwich necessitates the use of a crisp, perhaps even brittle, tender wafer. On the other hand, economics necessitates that the manufacturer operate the ice cream sandwich machine at as high production rate as is practical. Since the advent of the machine described in the aforesaid U.S. Patent 2,794,404, which has been widely adopted in the industry, it has been recognized that at certain comparatively low production rates the machine would produce satisfactory ice cream sandwiches; while at relatively higher production rates the production exhibited increasing proportions of cracked or broken wafers. At still higher machine speeds the extent of crackage and breakage becomes so great that the net useful production rate actually decreases, with increasing portions of the processed materials going to waste. Another problem encountered with the machines currently available is that a considerable amount of ice cream protrudes from between the wafers when the machines are operated above a particular speed. This phenomenon, which seems to result from a stretching of the ice cream, is believed to be partly responsible, along with the presence of broken wafers, for the increasing frequency of jamming in the wrapping machine when the ice cream sandwich machine is operated at these relatively high machine speeds. For example, using a high quality wafer having highly satisfactory tenderness and firmness characteristics and having about maximum acceptable toughness, a typical machine of the type described in the above cited patent produced sandwiches having virtually no broken wafers when operating at the production rate of 90 sandwiches per minute. At 108 units per minute, however, using the same batch of wafers, between 10 and 50% of the sandwiches produced contained wafers which were cracked or broken. At this speed, however, the ice cream held the cracked and broken wafers in place through the wrapping operation and the wrapping machine did not jam with intolerable frequency. At the rate of 112 units per minute, however, between 50 and 75% of the sandwiches produced had broken wafers, ice cream protruded from between the wafers in nearly all of the sandwiches, and the wrapping machine jammed with intolerable frequency. The net usable production rate at a machine rate of 112 units per minute was below the net usable production rate when the machine was operated at 108 units per minute, the proportion of waste at 112 units per minute being vastly increased. The particular ice cream manufacturer involved had set 108 as the maximum production rate for operation of the Rapp machine in his plant.

With the exception of my invention, all attempts known to me to provide means to increase substantially the useful production rates of the Rapp type machine have failed.

It is an object of this invention to provide an improvement in the ice cream sandwich machines of the type described in U.S. Patent 2,794,404 to E. J. Rapp, whereby the net usable production rate is substantially increased when the machine is operated at high speeds. Another object of this invention is to provide an improvement in ice cream sandwich making machines whereby ice cream sandwiches may be produced at substantially higher speeds than the maximum tolerable speeds of existing machines and yet provide ice cream sandwiches virtually free from cracked or broken wafers. It is a still further object of this invention to provide an ice cream sandwich machine which, at rates of production substantially higher than the maximum useful rates in existing machines, produces ice cream sandwiches in which the ice cream does not significantly protrude from between the wafers. Still another object of this invention is to provide an improvement of the character described above which can be economically and easily adapted to the existing machines.

These and other objects which will be apparent hereinafter are achieved by my invention which consists in the construction, arrangement and combination of various parts of the ice cream sandwich machine, as hereinafter more fully set forth, pointed out in my claims, and illustrated in the accompanying drawings wherein:

FIGURE 3 is an enlarged central, vertical, sectional view on the line 3—3 in FIGURE 5 through the conveyer wheel and through associate parts of the machine and shows in operation a sandwich having been completely received in a pocket of the conveyer and a sandwich having been removed from a pocket of the conveyer wheel.

FIGURE 4 is an outlined sectional view on the line 4—4 of FIGURE 5 to show the intermittent drive means for the sandwich-receiving rotor conveyer.

FIGURE 5 is a vertical sectional view on the line 5—5 of FIGURE 3 and shows the various operating mechanisms of the machine.

FIGURE 6 is a central vertical view of an alternative twelve pocket conveyer wheel 24'.

Figure 1:
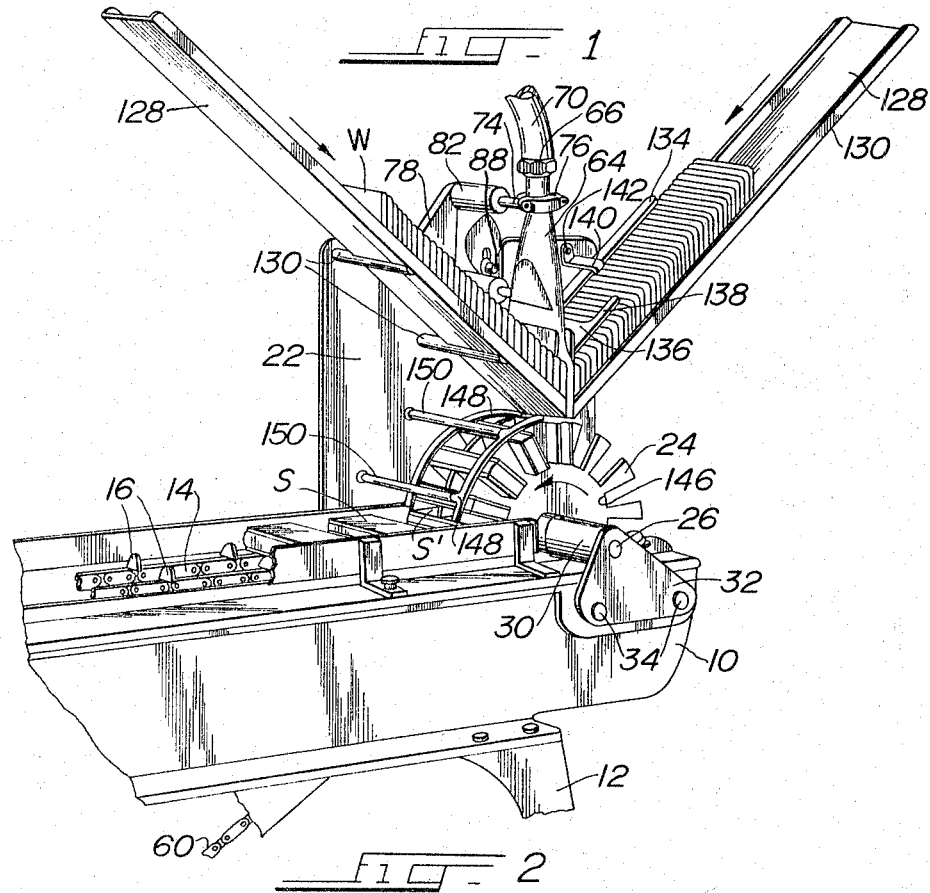
FIGURE 1 is a perspective view of an ice cream sandwich machine embodying my invention and showing it adapted to an ice cream sandwich machine of the type referred to above.
Figure 2:
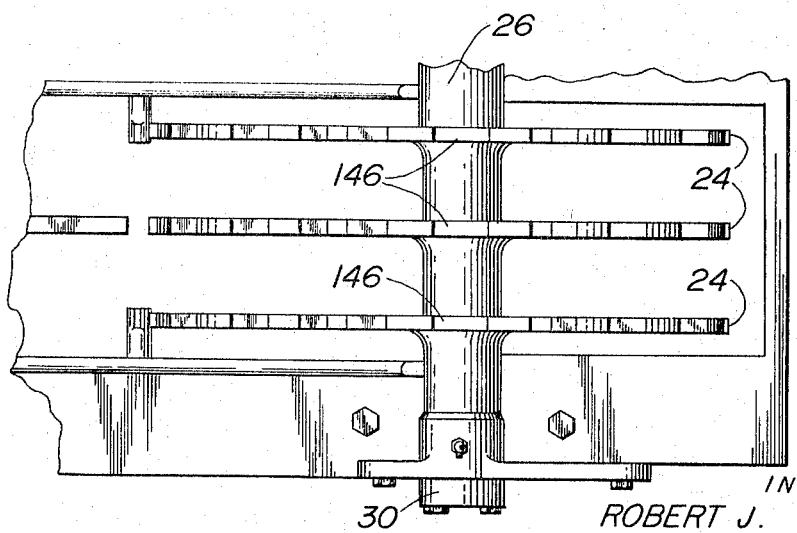
FIGURE 2 is a detailed top view of the circular conveyer wheel illustrated in FIGURE 1 showing the alignment of the notches in the three separate discs to provide pockets.

FIGURE 7 is an enlarged outlined sectional view of driving means similar to that shown in FIGURE 4, except that the driven Geneva wheel 42' has six slots or stations 44', instead of the eight stations 44 as illustrated in FIGURE 4.

On the accompanying drawings I have used the reference numeral 10 to indicate the frame of a wrapping machine which may be supported by suitable legs such as shown at 12. This machine includes a pair of intake conveyer chains 14 on which spaced lugs 16 are mounted on the chains extending over a pair of sprockets 18 mounted on a shaft 20. The shaft 20 is driven continuously for moving ice cream sandwiches indicated at S to a wrapping position where wrapping mechanism wraps them and discharges them from the wrapping machine. This mechanism forms no part of my present invention and has not been illustrated.

An ice cream sandwich machine improved by my invention is in the form of an attachment for the wrapping machine, thus far described, and consists of a suitable frame plate 22 attached to the wrapping machine frame 10 and supporting the mechanism of the sandwich machine which will be described in further detail below.

A sandwich receptor is provided in the form of discs 24 secured to a shaft 26 which is journaled in a bearing 28 and a bearing 30. The bearing 28 is secured to the frame plate 22, and the bearing 30 is provided with a flange 32 bolted to the frame 10 as at 34. See FIGURE 1. The shaft 26 is driven from the shaft 36 by means of a gear 38 secured to the shaft 26 and a pinion 40 secured to the shaft 36 and meshing with the gear 38. A Geneva disc, or driven Geneva wheel 42, is secured to the shaft 36 to which the pinion 40 is also secured. The disc 42 is provided with slots 44. The roller 46 is adapted to coact with the slots 44, this roller being carried by the rotator arm or driving arm 48, of the Geneva movement system, secured to a constantly rotating shaft 50. The shaft 50 is journaled in a bearing 54 of gear housing 56 and the shaft 36 is journaled in a bearing 52 in frame plate 22. The shaft 50 is rotated once each cycle of the operation of the wrapping machine by means of a sprocket 58 and a chain 60. The chain 60 extends to a suitable shaft of the wrapping machine (not shown) which is rotated once per cycle and thus the sandwich making machine is in timed relation to the continuously operating intake conveyer 14.

An ice cream extruding nozzle 64 is supported on the frame plate 22 and is connected by a union 66 and a nipple 68 to a transparent tube 70 into which plastic but form sustaining ice cream is supplied under pressure from the ice cream making apparatus. The ice cream is indicated generally at C and is adapted to be extruded between wafers W to form ice cream sandwiches S. A lower rod 72 is welded to the nozzle 64 and an upper rod 74 is welded to a collar 76 surrounding the neck of the nozzle and extending toward a bracket 78. This bracket has hubs 80 and 82 receiving the rods 72 and 74, respectively, and set screws 84 and 86 are provided for retaining the rods in the hubs. The heads of the set screws are knurled for quick adjustment for a purpose which will hereinafter appear. A surface of the plate 22 indicated at 73 acts as a definite stop for the rod 72 in order to locate the nozzle 64 so that it is accurately centered in relation to the sandwich receptor discs 24.

The bracket 78 is secured to the frame plate 22 by means of a pair of clamp screws 88 passing through slots 90 of the bracket and threaded into the plate. These slots permit vertical adjustment of the nozzle and a lifting screw 92 is provided for coaction with a guide rod support 94 on plate 22 for lifting the bracket 78 or lowering it when the screws 88 are loosened for adjustment purposes. After the adjustment is completed then, of course, the screws 88 are clamped tight.

A pair of guide rods 96 have their upper ends fixed in the support 94 and their lower ends fixed in hubs 98 of the gear housing 56. Sleeve portions 100 of a slide 102 are slidable vertically on the guide rods 96 and carry wafer-propelling plates 104 located on opposite sides of the nozzle 64 as shown in FIGURES 3 and 5. A cross brace 106 is provided between the plates 104.

For reciprocating the slide 102, a stud 108 projects therefrom to which the upper end of a link 110 is pivoted. The lower end is pivoted to a stud 112 carried by the outer end of a lever 114 which is pivoted at 116 to the frame plate 22. Intermediate the ends of the lever 114 a link 118 is pivoted thereto on a stud 119 and an adjusting rod 120 is threaded into the link 118 and into an eccentric strap 124. A lock nut 122 is provided on the adjusting rod to lock the adjustment. The eccentric strap surrounds an eccentric 126 secured to the constantly rotating shaft 50.

A pair of inclined chutes 128 are provided and these are supported in spaced relation to the frame plate 22 by means of four rods 130 welded thereto and passing through the frame plate and provided with nuts (not shown) to fasten the rods 130 to the plate 22. These chutes are for the purpose of containing stacks of the wafers W as shown in FIGURES 1 and 3 with the inclination of the chutes tending to force the wafers by gravity against the opposite sides of the nozzle 64 as illustrated.

Wafer hold-down bars 134 are located above the wafers W and adjacent the nozzle these are widened as at 136 and provided with hold-down fingers 138. The elements 134, 136 and 138 are supported by four brackets 140 bolted at 142 to the frame plate 22.

Pairs of resilient fingers 137 are provided below the wafers W adjacent the sides of the nozzle at the ejection end of the chutes 128. These fingers serve to support the lowermost wafer of each chute to prevent them from falling prior to their downward ejectment by plates 104.

The sandwich receptor discs 24 are provided with notches having sides 144 and bottoms 146. The sides 144 are slightly inclined so as to converge toward the center of rotation as shown in FIGURE 3. Sandwich hold-down rods 148 are supported by rods 150 extending from the frame plate 22 and these hold down rods 148 are arc-shaped to follow along the peripheries of the discs 24.

*Practical operation*

In the operation of my ice cream sandwich machine, stacks of wafers W are placed in the inclined chutes 128 and, due to gravity, will contact the opposite sides of the nozzle 64 as illustrated in FIGURE 3. The ice cream C is being constantly extruded under slight pressure due to the action of the ice cream making equipment and the extrusion, of course, is at a predetermined rate which may be varied somewhat depending upon various conditions.

Referring to FIGURE 3 the ice cream is continuously extruded from the discharge (lower) end of the nozzle 64 and the wafer propelling plates 104 engage the two wafers next to the nozzle and push them past the lower ends of the chutes 128 and into the pocket of the ice cream sandwich receptor (notches 144–146 of the discs 24) which at this time are aligned with the nozzle.

When the wafers are about half-way down they slant outwardly slightly and since the ice cream is being constantly extruded, whereas the wafers are lowered only intermittently, the ice cream is a little ahead of the wafers at this point. However, the speed of lowering of the wafers is faster than the extrusion of the ice cream so that by the time the wafers are completely in the notches 144–146 as shown in FIGURE 3 the ice cream is lagging slightly behind the wafers. This variation in relative speeds comes about by reason of the extrusion of the ice cream at a constant rate (which is desirable so that intermittent extrusion is unnecessary) and the periodic movement of successive wafers into the pockets of the ice cream sandwich receptor. Time must be given, of course, for the propeller plates 104 to move upwardly during each cycle of operation, and it is thus necessary to move the wafers downwardly at a faster rate than the ice cream. By permitting the ice cream to move first and the wafers to move thereafter but at a greater speed, the timing of all parts of the machine is possible.

Finally, when the sandwich receptor discs 24 start to rotate, this movement will cause the hindmost wafers to shear the ice cream off across the lower end of the nozzle 64 and complete the sandwich unit. The rotation of the conveyer-receptor 24 which causes the hindmost wafer to shear off the ice cream extrudate also brings the next empty slot into position to receive ice cream and wafers. FIGURE 3 illustrates that moment in the cycle when rotation of the conveyer receptor is just beginning. During the sandwich making operation, the slight taper of the pockets 144–146 permits the wafer to slant out due to the expansion of the ice cream as it leaves the nozzle and its pressure becomes atmospheric and this provides a certain degree of looseness between the wafer surfaces and the ice cream to permit relative movement of the one relative to the other so as to permit the continuous feeding of the ice cream and the intermittent feeding of the wafers without undesirably deforming the sandwich.

The illustrated sandwich receptor discs 24 are indexed one-sixteenth revolution each cycle of operation so that after four cycles the sandwich arrives at the position S′ where it can be engaged by the lugs of the chains 14 and moved along the intake conveyer of the wrapping machine to the wrapping position. There they are wrapped and after leaving the wrapping machine are boxed and introduced into a freezer for solidifying the sandwiches and preparing them for subsequent storage and distribution to vending machines, consumers, etc.

If the discs 24 rotate at very high speeds, the arc-shaped hold-down rods 148, which are supported by members 150 affixed to plate 22, retain the sandwiches in the slots of the disc. These rods terminate so as to clear the sandwich at position S′ for being taken away by the conveyer 14.

As to the timing of the various elements of my ice cream sandwich machine in relation to the wrapping machine, the lugs 16 engage the sandwich at position S′ and move it out of the slots of the discs 24 while the discs are stationary. Also while the discs 24 are stationary, the blades 104 are moved downwardly. Right after the lower limit of their movement, the conveyer discs 24 are indexed or rotated to the next station, and during the indexing period the plates 104 are moved upwardly while the discs are in motion.

As to the speed of the wrapping machine (and, therefore, the ice cream sandwich machine since the two are timed together), it is usual to provide in these wrapping machines an infinitely variable speed control and, therefore, the wrapping machine and the sandwich making machine can be accurately timed to the extrusion rate of the ice cream C whatever it may be. If it varies, the speed control of the wrapping machine is correspondingly reset.

When it is desired to begin operation of the machine, the proper nozzle is selected and quickly connected to the machine by inserting the rods 72 and 74 in the hubs 80 and 82 and the set screws 84 and 86 then tightened and the union connection 66 made. Since the nozzle will unavoidably be relatively warm, the ice cream making apparatus is operated for a period of time to pass ice cream of the proper consistency out of the nozzle, into a suitable container for subsequent return to the apparatus, until the nozzle has reached the proper chill temperatures. The wrapping operation can then be started by throwing in the clutch for the wrapping machine, thus running both it and the ice cream sandwich making mechanism. If the timing is found a little bit off, that is if the ice cream tends to over-fill or under-fill the sandwiches, the speed of the wrapping machine and the ice cream sandwich making mechanism can be changed as desired. The tube 70 is preferably made of a transparent plastic material so as to permit the flow of the ice cream to be seen therethrough, and to provide sufficient flexibility in the line for variation in the relative heights of the ice cream making apparatus and the sandwich making machine.

Although the sandwich receptor or conveyer wheel shown herein consists of three aligned notched discs, it will be clear to one skilled in the art that a pair or multiplicity of notched aligned discs are equivalent to that illustrated.

It will be apparent to one skilled in the art that the improved machine of my invention illustrated in the drawings herewith utilizes a rotor receptor which has a series of 16 separate uniformly spaced-apart pockets formed by the aligned notches 144–146 in the discs 24. These illustrated discs are indexed by driving means comprising an 8 station Geneva movement and gear means operatively engaging said discs and said Geneva movement for transmitting the rotation of the Geneva wheel to said discs, said gear means being adapted to generate one revolution of said disc per two revolutions of said driven Geneva wheel.

It is not essential, however, that the improvement of my invention be limited to the specific device illustrated in the drawings attached hereto. Generally, the improvement consists of the combination of elements comprising: separating means including a pair of spaced circular discs having notches therein providing a series of separate spaced-apart pockets, said pockets each having an open end for receiving therein a pair of wafers having extruded comestible therebetween; and means for intermittently moving said discs relative to the extrusion nozzle for successively positioning said pockets with their open ends in an oriented filling position closely adjacent the extrusion nozzle for receiving therein a pair of wafers having extruded comestible therebetween, whereby said pockets are adapted after filling and upon movement of said discs to shear off comestible across the discharge end of the nozzle, thereby delivering successive sandwiches; the improvement in which said discs provide a series of 12 or more separate uniformly spaced apart pockets, and said means for intermittently moving said discs being adapted to move said discs at an average speed of less than 11,000 degrees rotation per minute, preferably less than 10,000 degrees rotation per minute, while the discs are in motion when the machine is operating at a production rate of 110 units per minute.

A preferred embodiment of this invention is a combination providing an improvement in an ice cream sandwich making machine of the type in which soft ice cream is extruded between two wafers, positioned in pockets in a rotatably mounted conveyer wheel, the combination comprising: a conveyer wheel which has N separate uniformly spaced-apart pockets, wherein N is the number 12 or an even number greater than 12; driving means for intermittently revolving said conveyor wheel for successively positioning said pockets for receiving said wafers and soft ice cream, said driving means including a driven Geneva wheel having ½ N′ stations, wherein N′ is the number of pockets in said conveyer wheel; and gear means operatively associated with said driven Geneva wheel and said conveyer wheel, said gear means being adapted to transmit the intermittent revolution of the driven Geneva wheel to the conveyer wheel at the ratio of one revolution of the conveyer wheel per two revolutions of the driven Geneva wheel.

Hence, an example of an improvement which is in accordance with this definition of a preferred embodiment of my invention is the improvement utilizing a 12 pocket conveyer wheel 24′ illustrated in FIGURE 6 which is indexed by driving means illustrated in FIGURE 7 including a 6 slot, or 6 station, driven Geneva wheel 42′ with gears therebetween to provide one revolution of the conveyer wheel per two revolutions of the driven Geneva wheel. In this case, the driving means moves the conveyer wheel at an average speed of about 10,000 degrees rotation per minute while the conveyer is in motion when the machine is operating at 110 units production per minute. Various parts of the alternative conveyer wheel and driving means illustrated in FIGURES 6 and 7 respectively are identified by primed numbers. These parts clearly correspond to similar parts shown in FIGURES 3 and 4 which are identified by the same numbers, not primed, and which have been discussed in detail herein.

Another preferred embodiment of my invention is the one illustrated in the drawings attached hereto, in which a 16 pocket conveyer wheel is driven by an 8 station driven Geneva wheel with gears therebetween to rotate the conveyer one revolution per two revolutions of the driven Geneva wheel. In this embodiment, the means for moving the conveyer provides an average conveyer rotation speed of about 6,600 degrees rotation per minute while the conveyer is in motion when the machine is operating at 110 units per hour.

An example of an alternative embodiment of my invention which is not within the definition of the preferred embodiment described above is an improvement utilizing a 16 pocket conveyer wheel and a 4 station driven Geneva wheel with gears therebetween to provide one revolution of the conveyer wheel per four revolutions of the driven Geneva wheel. In this embodiment the conveyer is moved at an average speed of about 9,850 degrees of rotation per minute while the conveyer is in motion when the machine is operating at about 110 units production per minute.

While the particular value of the "average speed of the conveyer while in motion" may be measured experimentally, it may be more conveniently determined by calculation. The average speed of the conveyer wheel while in motion may be calculated in the following manner:

Average speed while in motion =
$$\frac{(\text{Degree rotation per cycle})}{(\text{Time in actual rotation per cycle})}$$

where (degree rotation per cycle) is determined by dividing 360° by the number of pockets in the conveyer. In those embodiments in which the means for moving the conveyer utilizes a Geneva indexing system, the time during which the conveyer is in motion each cycle may be calculated as follows:

Time in actual rotation per cycle =
(percent of rotation of *driving* Geneva arm in which driving Geneva arm is driving the driven Geneva wheel) multiplied by (time lapse per complete cycle) divided by 100

The number of degrees of rotation of a driving Geneva arm or wheel during which the driving arm is driving the slotted or driven Geneva wheel is a characteristic of the system and depends on the number of stations in the system. A 4 station driven Geneva wheel is in driving engagement with the driving arm during 90° of the rotation of the driving arm. In a 6 station system, it is 120°; 8 station, 135°. Hence, in an 8 station Geneva system, the driving arm is driving the driven Geneva wheel during 135° of the rotation of the driving arm, or during $$\left(\frac{135°}{360}\times 100\right)$$

or 37.5% of its rotation per cycle.

At a production rate of 110 units per minute, (1/110) or .0091 minute is the time per cycle. Hence, during 37.5% of the .0091 minute cycle, the driven Geneva wheel is moving the conveyer wheel; therefore, the driven Geneva wheel, and consequently the conveyer wheel is in motion for about (.375×.0091) or .0034 minute per cycle when the machine is operating at 110 units production per minute. Since there are 16 pockets in the wheel of this example, each cycle involves a rotation of (360°/16) or 22.5° rotation of the conveyer wheel per cycle. Hence, average speed while in motion
$$=\frac{(22.5°\text{ rotation per cycle})}{(.0034\text{ minutes per cycle})}$$
$$=6,617°\text{ rotation per minute}$$

It will be immediately apparent to one with ordinary skill in the art that the improvement of my invention can be easily and economically adapted to existing machines of the type described in the Rapp patent. However, machines utilizing the improvement of my invention may be usefully operated at vastly higher production rates than the machine described in the Rapp patent. Yet, machines utilizing my invention can produce, at these vastly higher production rates, ice cream sandwiches in which the tender wafers are substantially free of cracks or breaks and in which the ice cream does not protrude from between the wafers as in the Rapp machine.

For example, in an actual ice cream plant test, in which a machine as described in the Rapp patent was operated along side an otherwise identical machine improved in accordance with this invention, the maximum usable production rate of the unimproved Rapp machine was about 108 units per minute while the maximum usable rate of the machine improved in accordance with this invention could not be determined because of limitations in available freezer capacity. However, the machine improved in accordance with this invention operated at the rate of 145 units per minute during the test to produce sandwiches which were entirely free of cracks and breaks and in which no ice cream protruded from between the wafers. The outstanding quality of the sandwiches thus produced by the improved machine permitted the wrapping machine to operate smoothly without any jamming at the 145 units per minute production rate. This is contrasted to the intolerable degree of jamming encountered in the wrapping section of the other machine during the test at a production rate of about 112 units per minute. At this rate, between 50 and 75% of the sandwiches produced on the unimproved machine had broken wafers and virtually all of the sandwiches produced had excessive quantities of ice cream protruding from between the wafers. It was estimated that the quality of the sandwiches produced by the machine improved in accordance with this invention when operating at 145 units per minute was equivalent to the quality of the product of the Rapp machine when operated at approximately 90 units per minute.

I claim:

1. In a sandwich making machine of the type including an extrusion nozzle having a discharge end from which a plastic comestible may be continuously extruded, means for feeding wafers against opposite sides of said nozzle and for moving them in the direction the comestible is being extruded, separating means including a pair of spaced circular discs having notches therein providing a series of separate spaced-apart pockets, said pockets each having an open end for receiving therein a pair of wafers having extruded comestible therebetween, and means for intermittently moving said discs relative to the extrusion nozzle for successively positioning said pockets with their open ends in an oriented filling position closely adjacent the extrusion nozzle for receiving therein a pair of wafers having extruded comestible therebetween, whereby said pockets are adapted after filling and upon movement of said discs to shear off comestible across the discharge end of the nozzle, thereby delivering successive sandwiches, the improvement in which said discs provide a series of 12 or more separate uniformly spaced-apart pockets, and said means for intermittently moving said discs is adapted to move said discs at an average speed of less than 11,000 degrees rotation per minute while the discs are in motion when the machine is operating at a production rate of 110 units per minute.

2. An improvement as in claim 1 in which said discs provide 16 separate uniformly spaced-apart pockets and in which said means for intermittently moving said discs includes an 8 station driven Geneva wheel and gear means operatively engaging said discs and said Geneva wheel for transmitting the intermittent rotation of the driven Geneva wheel to said discs, said gear means being adapted to generate one revolution of said discs per two revolutions of said driven Geneva wheel.

3. In an ice cream sandwich making machine of the type in which soft ice cream is extruded between two wafers positioned in pockets in a rotatably mounted conveyer wheel, the combination comprising a conveyer wheel which has N separate uniformly spaced-apart pockets, wherein N is the number 12 or an even number greater than 12, and rotating means for intermittently revolving said conveyer wheel at an average speed of less than 11,000 degrees rotation per minute while the wheel is in motion when the machine is operating at a production rate of 110 units per minute, said rotating means being means for successively positioning said pockets for receiving said wafers and soft ice cream, said rotating means including a driven Geneva movement wheel having ½ N′ stations, wherein N′ is the number of pockets in said conveyer wheel, and gear means operatively associated with said driven Geneva movement wheel and said conveyer wheel, said gear means being adapted to transmit the intermittent revolution of the driven Geneva movement wheel to the conveyer wheel at the ratio of one revolution of the conveyer wheel per two revolutions of the driven Geneva wheel.

References Cited by the Examiner

UNITED STATES PATENTS

| | | | |
|---|---|---|---|
| 2,794,404 | 6/1957 | Rapp | 107—1 |
| 3,119,353 | 1/1964 | Roehn | 107—1 |

WALTER A. SCHEEL, *Primary Examiner.*

J. SHEA, *Assistant Examiner.*